United States Patent [19]
McCracken et al.

[11] Patent Number: 6,088,456
[45] Date of Patent: Jul. 11, 2000

[54] DATA ENCRYPTION TECHNIQUE

[75] Inventors: Douglas William McCracken; James Milne Leith, both of Olney; William Richard Burey, Sanderstead, all of United Kingdom

[73] Assignee: Desktop Guardian Limited, Olney, United Kingdom

[21] Appl. No.: 08/969,668

[22] Filed: Nov. 13, 1997

[30] Foreign Application Priority Data

Nov. 15, 1996 [GB] United Kingdom .................... 9623774

[51] Int. Cl.$^7$ ........................................ H04L 9/00
[52] U.S. Cl. ................... 380/259; 380/262; 380/259; 380/268; 380/283
[58] Field of Search ................... 380/255, 277, 380/259, 262, 268, 280, 283, 282

[56] References Cited

U.S. PATENT DOCUMENTS

| | | | |
|---|---|---|---|
| 4,004,089 | 1/1977 | Richard | 178/22 |
| 5,003,597 | 3/1991 | Merkle | 380/28 |
| 5,113,444 | 5/1992 | Vobach | 380/47 |
| 5,193,115 | 3/1993 | Vobach | 380/115 |
| 5,251,258 | 10/1993 | Tanaka | 380/21 |
| 5,335,280 | 8/1994 | Vobach | 380/42 |
| 5,574,789 | 11/1996 | Nakamura | 380/21 |
| 5,600,720 | 2/1997 | Iwamura | 380/1 |
| 5,627,894 | 5/1997 | Albert | 380/46 |
| 5,703,948 | 12/1997 | Yanovsky | 380/21 |
| 5,757,913 | 5/1998 | Bellare | 380/23 |
| 5,787,179 | 7/1998 | Ogawa | 380/46 |
| 5,799,088 | 8/1998 | Raike | 380/30 |
| 5,799,090 | 8/1998 | Angert | 380/43 |

OTHER PUBLICATIONS

Applied Cryptography, Bruce Schneier (John Wiley & Sons, Inc., 1996) Chapter 23.15 Probabilistic Encryption, p. 552–554.

*Primary Examiner*—Tod R. Swann
*Assistant Examiner*—Paul E. Callahan
*Attorney, Agent, or Firm*—Merchant & Gould, P.C.

[57] ABSTRACT

A method of encrypting data is described in which a random variable (6A–6D) is generated in binary digital form. A first set of data (8A–8J) representing a plaintext message in binary digital form is combined with the random variable (6A–6D) to generate a second data set (9A–9J) in binary digital form. The data bits representing the random variable (6A–6D) are inserted into the second data set (9A–9J) according to a first predetermined set of rules and the order of the data bits in the second data set (9A–9J) is altered according to a second predetermined set of rules. A third data set (17A–17N) for transmission as a ciphertext message is thus generated.

25 Claims, 16 Drawing Sheets

Cipher takes sets of 10 bytes of plaintext, for example:
plaintext 10
chars:    a  b  c  d  e  f  g  h  i  j    <--- 1A - 1J on encryption, creates ciphertext of 14 characters:

ciphertext 14
chars:    a  0  6  Ù  +  ,  #  ‹  ›  3  Ð  ê  µ    <--- 2A - 2N
          97 251 54 217 43 44 35 139 94 155 51 208 234 181 on decryption, returns the original plaintext:

decrypted 10
chars:    a  b  c  d  e  f  g  h  i  j    <--- 3A - 3J

*FIG. 1*

**Encrypt
method: for each set of 10
bytes:**
(1) create 4 pseudorandom
numbers

| | | | |
|---|---|---|---|
| | randoms | 5A - 5D ---> | 127 153 |
| | | 5A - 5D ---> | 127 153 |
| | random nos: | | 127 |
| | bits of random nos | 6A - 6D ---> | 0   1 |
| | ENCRYPT: | | 127 |

(2) 10 plaintext characters:
                                                                        1

| | | | |
|---|---|---|---|
| | source chars (10): | 1A - 1J ---> | a |
| | ascii val: | 7A - 7J ---> | 97 |

(3) convert to bits, 10 x 8            bit           8A - 8J --->      0│  1
                                       bits of rand nos,note 1 1st set            0   1

(4) XOR with random numbers,
refer note 1.

| | | | |
|---|---|---|---|
| | XOR to random bits | 9A - 9J ---> | 0   0 |
| | bits of rand nos,note 1 2nd set | 10A - 10J ---> | 1│  0 |

(5) XOR with random numbers,
refer note 1.            XOR to random bits   11A - 11J --->   1   0

(6) take 10 x 8 bits, break into
16 x 5 bit groups            split to groups of 5   12A - 12P --->   | 1   0 |
                                                    13A - 13P --->     1   0

(7) for each of the 16 sets of 5
bits, create 16 sets of 7 bits            from                                 1   2

(8) move bits from the original
5-bit set to the seven-bit set,
according to the rules as
shown: refer note 2.            to                                             3   5
                               move to new position   15A - 15P --->

(9) fill the remaining two bits in
each of the 16 7-bit sets with
the bits from the random
numbers: refer note 3.            insert randoms    16A - 16P --->    0   1

(10) arrange the 16 7-bit sets
into 14 8-bit bytes            back to 8 bit bytes   17A - 17N --->   | 0   1 |
                               ascii val                                97

(11) this becomes the
ciphertext            character:            2A - 2N --->            a

|   |   |   |   |   |   | 41 |   |   |   |   |   |   |   |   |   |   |
|---|---|---|---|---|---|----|---|---|---|---|---|---|---|---|---|---|
| 1 | 0 | 1 | 0 | 0 | 1 | 0  | 0 | 1 | 0 | 1 | 0 | 0 | 1 |   |   |
|   |   |   |   |   |   | 41 |   |   |   |   |   |   |   |   |   |   |
|   |   |   |   |   |   | 4  |   |   |   |   |   |   |   |   |   |   |
|   |   |   |   |   |   | d  |   |   |   |   |   |   |   |   | 5 |   |
|   |   |   |   |   |   | 100|   |   |   |   |   |   |   |   | e |   |
|   |   |   |   |   |   |    |   |   |   |   |   |   |   |   |101|   |
| 1 | 0 | 0 | 0 | 1 | 1 | 0  | 1 | 1 | 0 | 0 | 1 | 0 | 0 |   | 0 | 1 |
| 1 | 0 | 1 | 0 | 0 | 1 | 0  | 0 | 1 | 0 | 1 | 0 | 0 | 1 |   | 0 | 1 |

| 0 | 0 | 1 | 0 | 1 | 0 | 0 | 1 | 0 | 0 | 1 | 1 | 0 | 1 |   | 0 | 0 |
|---|---|---|---|---|---|---|---|---|---|---|---|---|---|---|---|---|
| 1 | 0 | 1 | 0 | 0 | 1 | 0 | 1 | 1 | 1 | 1 | 1 | 1 | 1 |   | 1 | 0 |
| 1 | 0 | 0 | 0 | 1 | 1 | 0 | 0 | 1 | 1 | 0 | 0 | 1 | 0 |   | 1 | 0 |

| 1 | 0 | 0 | 0 | 1 | 1 | 0 | 0 | 1 | 1 | 0 | 0 | 1 | 0 | 1 | 0 |
|---|---|---|---|---|---|---|---|---|---|---|---|---|---|---|---|
| 1 |   | 0 | 1 | 1 | 0 |   | 0 | 0 | 1 | 1 |   |   | 0 |   |   |

| 1 | 1 | 0 |   |   | 0 | 1 | 1 | 0 | 1 |   |   | 0 | 1 |   | 0 | 0 |
|---|---|---|---|---|---|---|---|---|---|---|---|---|---|---|---|---|

| 1 | 1 | 0 | 1 | 1 | 0 | 1 | 1 | 0 | 1 | 1 | 0 | 0 | 1 |   | 0 | 0 |
|---|---|---|---|---|---|---|---|---|---|---|---|---|---|---|---|---|
| 1 | 1 | 0 | 1 | 1 | 0 | 1 | 1 | 0 | 1 | 1 | 0 | 0 | 1 |   | 0 | 0 |

|   |   |   |   |   |   | 6<br>f<br>102 |   |   |   |   |   |   |   | 7<br>g<br>103 |   |
|---|---|---|---|---|---|---|---|---|---|---|---|---|---|---|---|
| 1 | 0 | 0 | 1 | 0 | 1 | 0 | 1 | 1 | 0 | 0 | 1 | 1 | 0 | 0 | 1 |
| 1 | 1 | 1 | 1 | 1 | 1 | 1 | 0 | 0 | 1 | 1 | 0 | 0 | 1 | 1 | 0 |
| 0 | 1 | 1 | 0 | 1 | 0 | 1 | 1 | 1 | 1 | 1 | 1 | 1 | 1 | 1 | 1 |
| 0 | 1 | 1 | 0 | 0 | 1 | 1 | 0 | 1 | 0 | 1 | 0 | 0 | 1 | 0 | 0 |
| 0 | 0 | 0 | 0 | 1 | 1 | 0 | 1 | 0 | 1 | 0 | 1 | 1 | 0 | 1 | 1 |

| 0 | 0 | 0 | 0 | 1 | 1 | 0 | 1 | 0 | 1 | 0 | 1 | 1 | 0 | 1 | 1 |
|---|---|---|---|---|---|---|---|---|---|---|---|---|---|---|---|
|   | 0 | 1 | 1 | 0 | 0 |   | 1 | 0 | 1 | 0 | 0 |   |   |   | 0 |

| 1 |   |   |   | 0 | 1 | 1 | 0 | 0 |   |   | 1 | 1 | 0 | 0 | 0 |
|---|---|---|---|---|---|---|---|---|---|---|---|---|---|---|---|

| 1 | 0 | 1 | 0 | 1 | 1 | 0 | 0 | 1 | 0 | 1 | 1 | 0 | 0 |   | 0 | 0 |
|---|---|---|---|---|---|---|---|---|---|---|---|---|---|---|---|---|
| 1 | 0 | 1 | 0 | 1 | 1 | 0 | 0 | 1 | 0 | 1 | 1 | 0 | 0 |   | 0 | 0 |
|   |   |   |   |   | 44 |   |   |   |   |   |   |   |   |   | 35 |   |
|   |   |   |   |   |   |   |   |   |   |   |   |   |   |   | # |   |

| 1 | 0 | 0 | 1 | 1 | 1 | 0 | 0 | 1 | 1 | 1 | 1 | 0 | 1 | 0 |
|---|---|---|---|---|---|---|---|---|---|---|---|---|---|---|
| 0 | 0 | 1 | 1 |   | 0 | 1 | 0 | 1 | 0 |   |   | 1 | 1 | 0 |

```
              0   0   0   1   1           0   0   1   0   1                1

1   0   0   0   1   1   1   0   0   0   1   0   1   1        0   1
```

| 1 | 0 | 0 | 0 | 1 | 1 | 1 | 0 | 0 | 0 | 1 | 0 | 1 | 1 | | 0 | 1 |
|---|---|---|---|---|---|---|---|---|---|---|---|---|---|---|---|

|   |   |   |   |   |   |   |   |   |   |   |   |   |   |
|---|---|---|---|---|---|---|---|---|---|---|---|---|---|
| 0 | 0 | 1 | 1 | 1 | 1 | 0 | 1 | 0 | 1 | 1 | 0 | 1 | 0 |

```
  1   1           1   0   0   1   1           1   0   0       1   1

0   1   1   1           1   0   0   1   1           1           0   0

0   1   1   1   1   0   1   0   0   1   1   0   1   1           0   0
```

| 0 | 1 | 1 | 1 | 1 | 0 | 1 | 0 | 0 | 1 | 1 | 0 | 1 | 1 |   | 0 | 0 |
|---|---|---|---|---|---|---|---|---|---|---|---|---|---|---|---|---|

| 1 | 0 | 1 | 0 | 1 | 0 | 1 | 0 | 1 | 1 | 0 | 1 | 0 | 1 |

DECRYPT (1) take the 14 bytes, convert to bits asc11 val: 2A - 2N ⟶ | 97 | | | | | | | | | | | | | | 251 |

20A - 20N ⟶ bits: 0 1 1 0 0 0 0 1 ... 1 1 1 1 1 1 1 1

(2) arrange as 16 sets of 7 bits

21A - 21P ⟶ sets of 7
position in 7: 1 2 3 4 5 6 7 ... 1 2 3 4

(3) extract bits to create random numbers, as per rules in (9) above

22 ⟶ remove random bits
6A - 6D ⟶ build random no. bits
5A - 5D ⟶ 127 ... 153

(4) take remaining 5 bits from each 7-bit set, create 16 5-bit sets as per rules in (8) above rebuild sets of 5
23A - 23P ⟶ from: 3 5 4 7 6
24A - 24P ⟶ to: 1 2 3 4 5
move to original position (5) take 16 5-bit sets, arrange as 8-bit bytes 25A - 25J ⟶ make contiguous sets of 5
5A - 5D ⟶ random bits, Note 1 2nd set (6) XOR with random numbers as per (4) above 26A - 26J ⟶ XOR to random bits
5A - 5D ⟶ random bits, Note 1 1st set (7) XOR with random numbers, as per (4) above 27A - 27J ⟶ XOR to random bits (8) Plaintext is:

DATA ENCRYPTION TECHNIQUE

The present invention relates to a method of encrypting and decrypting data, for example for use in transmitting confidential information over non-secure data links or the Internet, and to an apparatus for encrypting and decrypting data. The invention also relates to a method of manufacturing a computer system or software for implementing the encrypting/decrypting technique.

Many methods of encrypting data are known. In simple terms, most of these methods involve applying a cipher and a "key" to the original message to produce an encrypted message that cannot be decrypted without knowing the appropriate cipher and key. Such methods can be broken if the same key is used to encrypt a large number of messages, as a pattern may begin to appear in the encrypted messages that enables the key to be identified.

One way of avoiding this problem is to use a "one time pad" encryption technique. This involves using each key only once, so that patterns do not appear in the encrypted messages. Of course, this means that both the sender and the receiver of the encrypted message must have a large number of different keys and each must know which key to use each time. Implementing such a technique clearly therefore has practical difficulties and there are also security implications in the need for both parties to carry a large number of different keys, that may be stolen or obtained by, for example, blackmail or bribery.

In order to avoid these problems, it has been suggested that instead of the receiver keeping a "key book" of different keys, a new key for deciphering the message should be transmitted to the receiver whenever a message is sent. This method again has problems however, as it is possible that the key message could be intercepted, enabling an unauthorised person to decipher the confidential message.

It is an object of the present invention to mitigate at least some of the above mentioned problems and disadvantages.

According to the present invention there is provided a method of encrypting data in which a random variable is generated in binary digital form, a first set of data representing a plaintext message in binary digital form is combined with the random variable to generate a second data set in binary digital form, the data bits representing the random variable are inserted into the second data set according to a first predetermined set of rules and the order of the data bits in the second data set is altered according to a second predetermined set of rules, thereby generating a third data set for transmission as a ciphertext message.

The order in which the steps of the encryption process are carried out need not necessarily be the order in which those steps are mentioned above. For example, the data bits representing the random variable may be inserted into the second data set either before or after the order of the data bits in the second data set is altered. Providing the decryption process is a reverse of the encryption process, the message will still be deciphered correctly.

Because the encryption technique does not use a predetermined key and instead utilises random variables to encrypt the plaintext message, this makes it extremely difficult for an unauthorised person to decipher the message, for example by looking for patterns in the encrypted message. Further, because the random variables needed to decipher the message are hidden within the ciphertext rather then being transmitted separately, there is no danger of them being intercepted and used to decipher the message. Only the intended recipient of the message can readily recreate the random variables because the data bits representing those variables are hidden within the ciphertext at locations that can only be determined by referring to the internal rules of the encryption/decryption process. However, as each version of the encryption software is unique and the internal rules for locating and regenerating the random variables are not readily accessible, the method is highly secure.

Further, because the computer software can be distributed without the need for secrecy a new version of the software with new internal rules can be supplied very easily. Therefore, even if an unauthorised person is able to obtain covertly a copy of the decryption software, any loss of confidentiality can be avoided simply by switching to a new version of the software. As new versions of the software can be distributed very quickly and easily, for example by transmission over the Internet, the software can be changed frequently, for example every day.

The first set of data may be combined with the random variable by means of the XOR function. The XOR function as used herein is as described in the Borland Turbo C++™ V.III User's Guide (©1992) at page 425 ("Bitwise operators, bitwise XOR").

Advantageously, the random variable comprises a plurality of random numbers and those random numbers are combined with the first set of data according to a third predetermined set of rules. The random numbers may be combined by means of the XOR function with the first set of data one or more times, the order of said random numbers being varied each time.

The first data set, the random numbers and the third data set may all be in the form of 8-bit words. Advantageously, the second data set is divided into 5-bit words, which are expanded to 7-bit words by the inclusion of the data representing the random numbers and then re-divided into 8-bit words.

Advantageously, the plaintext message is encrypted in blocks of ten characters, which are represented in the first data set as ten 8-bit words and are combined with four 8-bit random numbers to produce a third data set of fourteen 8-bit words. Preferably, a plaintext message of ten characters is converted during encryption to a ciphertext message of fourteen characters.

Optionally, the plaintext message may be compressed prior to encryption, which may result in the ciphertext message being shorter than the plaintext.

A message header may be added to the plaintext message and encrypted together with the plaintext message. The message header may include data identifying the intended recipient of the plaintext message and/or data identifying the sender of the plaintext message. The identity of the sender may be verified before data identifying the sender is included in the message header.

The present invention further provides a method of decrypting data that has been encrypted using a method as described above, in which the data bits representing the random variable are extracted from the third data set according to a first predetermined set of complementary rules and the order of the data in the third data set is altered according to a second predetermined set of complementary rules to regenerate the second data set, the random variable is recreated, and the second data set is combined with the random variable to regenerate the first set of digital data representing the plaintext message.

Advantageously, the message header is decrypted before the plaintext message. Preferably, the data identifying the intended recipient of the plaintext message is extracted, the identity of the actual recipient- is verified and the plaintext message is decrypted only if the actual recipient is the intended recipient.

The present invention yet further provides a method of encrypting and decrypting data, the method comprising an encryption method and a decryption method as described above.

The present invention yet further provides a method of transmitting data, the method comprising encrypting and decrypting data as described above and transmitting the encrypted data from a sender to a receiver.

According to a further aspect of the present invention there is provided a device for encrypting data, the device including input means for receiving a first set of data representing a plaintext message in binary digital form, generator means for generating a random variable in binary digital form, processor means for combining said first set of data with said random variable to generate a second data set in binary digital form, for inserting the data bits representing the random variable into the second data set according to a first predetermined set of rules and for altering the order of the data bits in the second data set according to a second predetermined set of rules, thereby generating a third data set representing a ciphertext message, and output means for transmitting said ciphertext message.

The device may take the form of a dedicated electronic processor or a computer programmed to operate according to the invention.

Said processor means may include means for adding to said ciphertext message an encrypted message header containing data identifying the intended recipient of the message. The message header may also include data identifying the sender of the plaintext message, and the identity of the sender may be verified before data identifying the sender is included in the message header.

According to a further aspect of the present invention there is provided a device for decrypting data that has been encrypted using the device described above, said device including input means for receiving said ciphertext message, processor means for extracting data bits representing said random variable from said ciphertext message according to a first predetermined set of complementary rules, for altering the order of the data in said ciphertext message according to a second predetermined set of complementary rules, for regenerating the random variable, and for combining data in said ciphertext message with the random variable to regenerate the plaintext message, and output means for said plaintext message.

Advantageously, said processor means includes means for extracting from said encrypted message header said data identifying the intended recipient of the message, verifying the identity of the actual recipient and comparing the identity of the actual recipient with that of the intended recipient, said processor means being arranged to decrypt said ciphertext message only if the actual recipient is the intended recipient.

The present invention yet further provides a method of manufacturing means for implementing an encryption and decryption method as described above, the method including the steps of extracting complementary sets of predetermined rules from a database, incorporating those rules into algorithms for encrypting and decrypting the data, and recording those algorithms in means for implementing the encryption and decryption methods.

Advantageously, after the complementary sets of predetermined rules have been extracted from the database, the database is marked to prevent those rules being used again.

Advantageously, the steps of extracting the complementary sets of predetermined rules from the database and incorporating those rules into the algorithms for encrypting and decrypting the data are carried out automatically and without any record being made of the predetermined rules incorporated into the means for implementing the encryption and decryption methods.

An embodiment of the invention will now be described, by way of example, with reference to the accompanying drawings, in which:

FIG. 1 is an example of a message in encrypted and decrypted states;

FIG. 2 is an example of the encryption process;

Figure 3B:
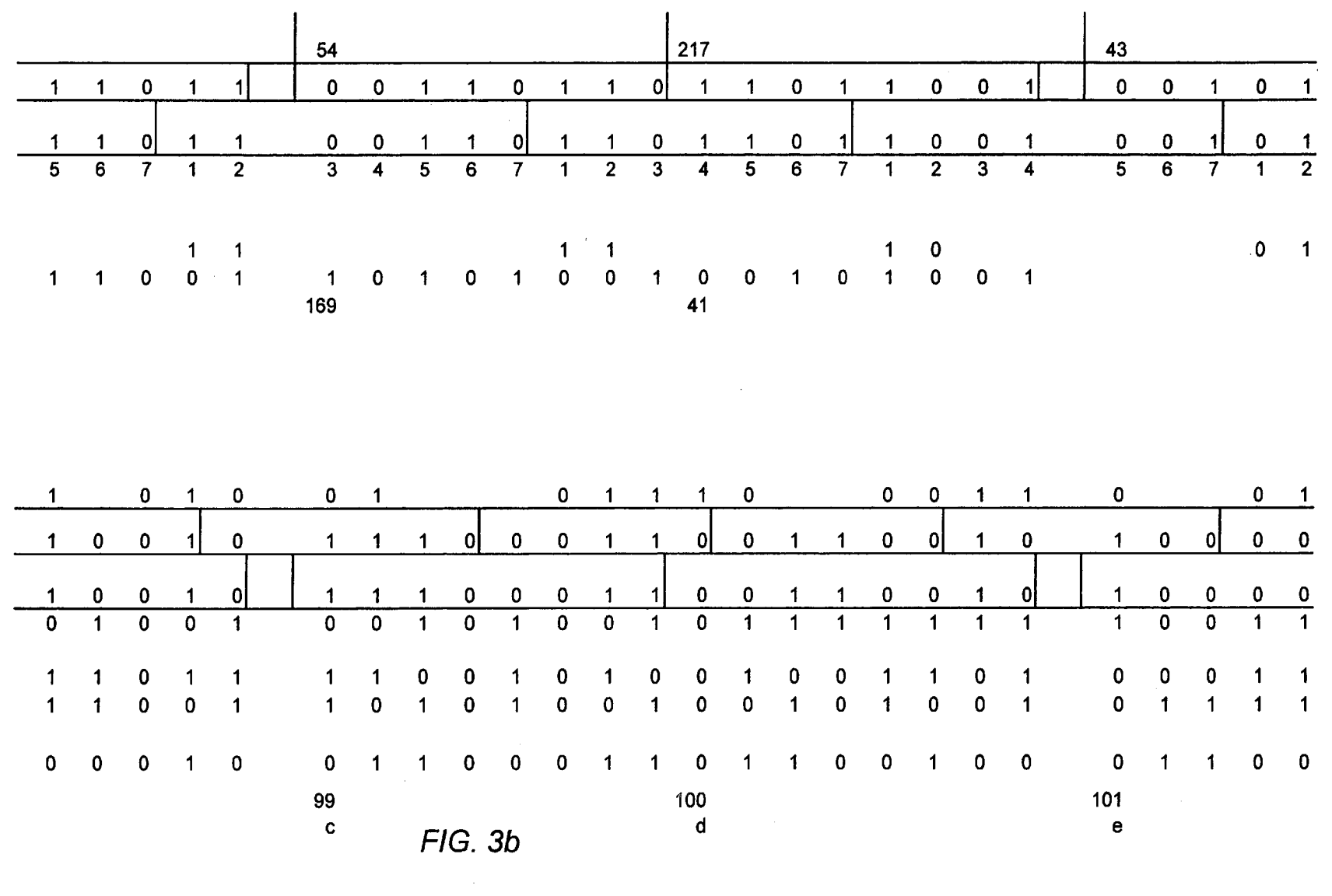
Figure 3C:
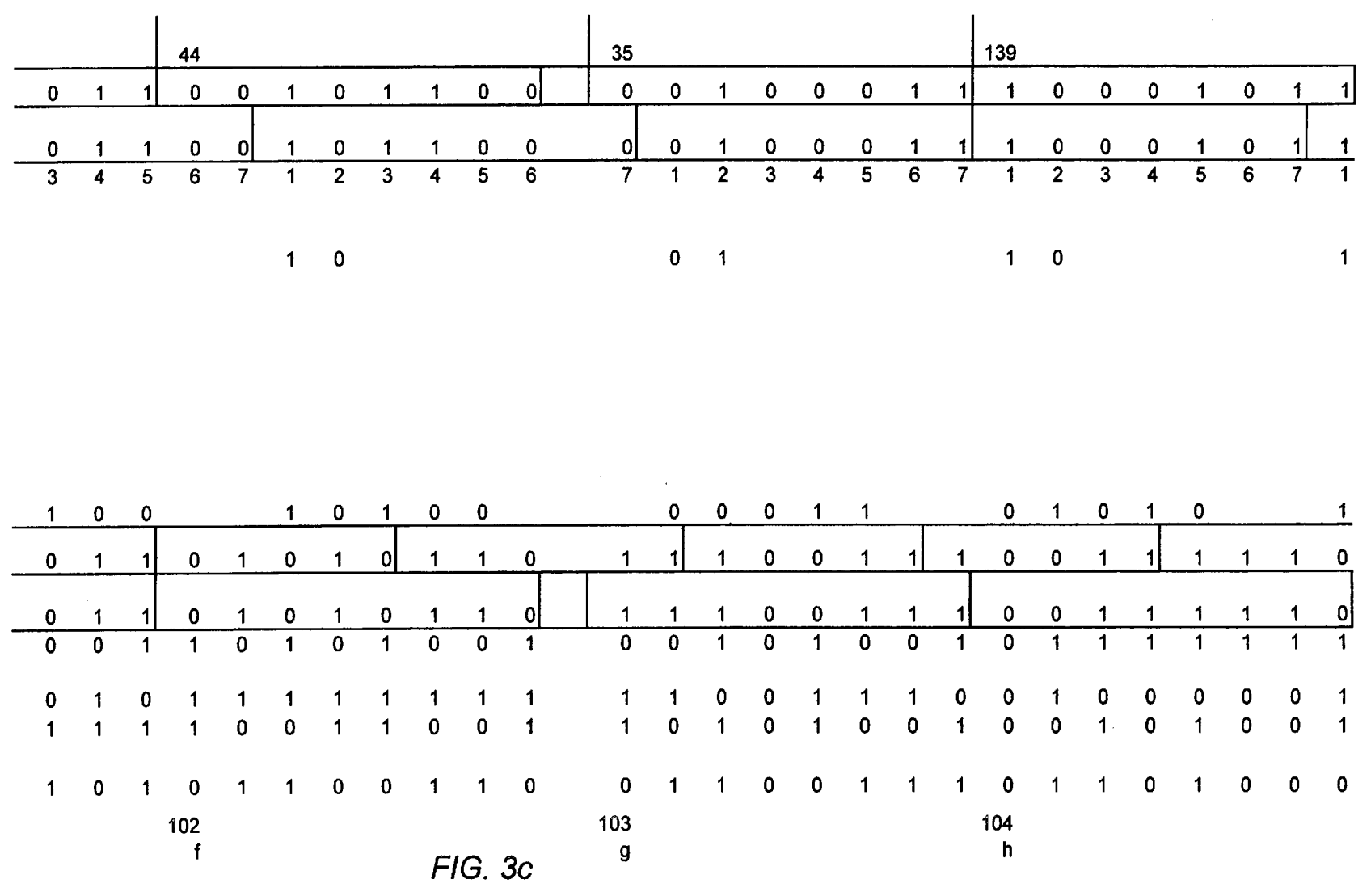
Figure 3D:
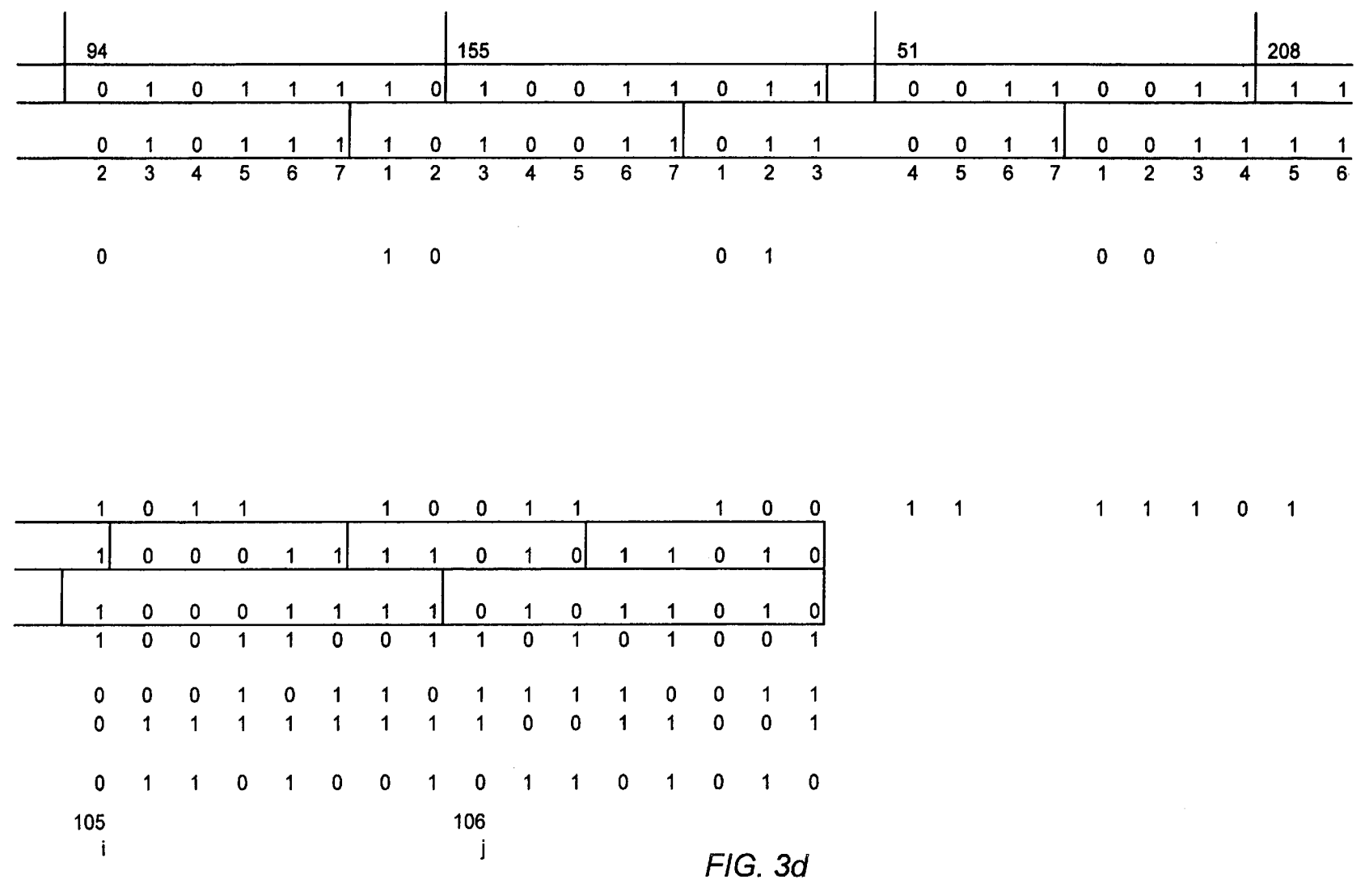
Figure 3E:
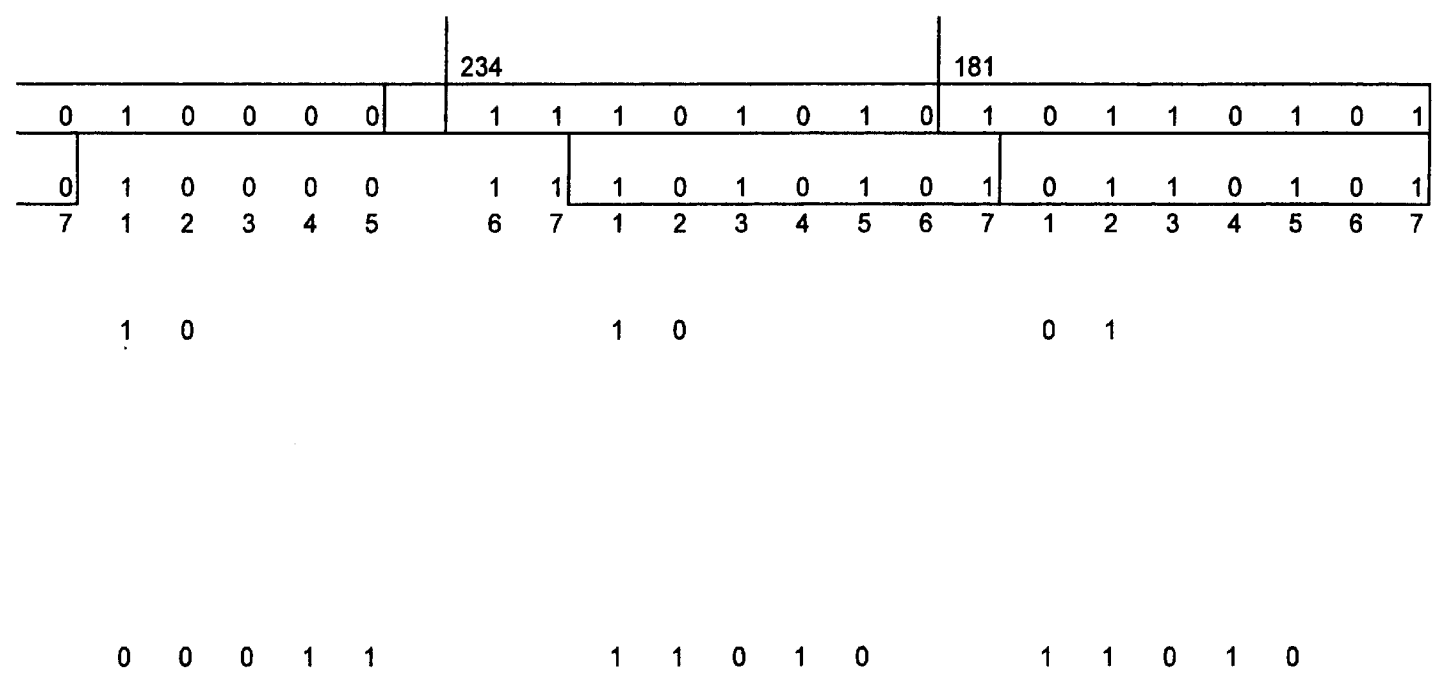

FIG. 3 is an example of the decryption process;

Figure 4:
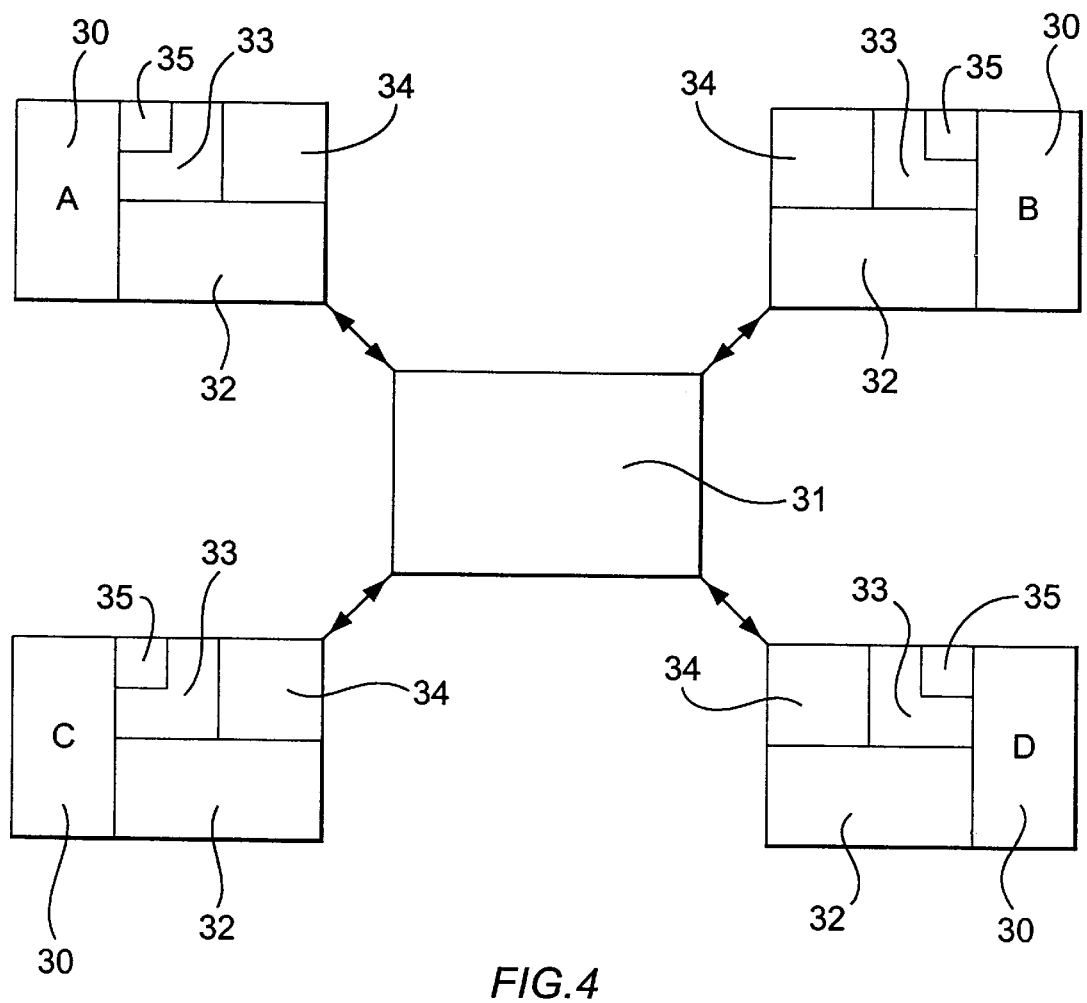
FIG. 4 is a flow diagram illustrating the use of a modified a encryption technique by a licence group.

The present invention employs an encryption technique known as "probabilistic encryption". In this technique, which is described in Applied Cryptography, second edition by Bruce Schneier, pages 552–554 (John Wiley & Sons, Inc., 1996) ISBN 0471117099, the encryption algorithm is designed such that any particular plaintext is equally likely to result in any of a large number of different ciphertexts, all of which will generate the same plaintext when the message is deciphered. This makes it extremely difficult for an unauthorised person intercepting the message to learn anything about either the plaintext of the encryption algorithm.

FIG. 1 is an example of how a plaintext message may be transformed as it is encrypted and decrypted. In the example, the plaintext message consists of ten characters 1A–1J. On encryption, this becomes a message consisting of fourteen ASCII text characters 2A–2N. The ciphertext message may be transmitted from the sender to the receiver by conventional means such a modem connected to a data link or a telephone line.

The ciphertext message is received and decrypted by the recipient, where upon it returns to the original message of ten plaintext characters 3A–3J.

Figure 2B:
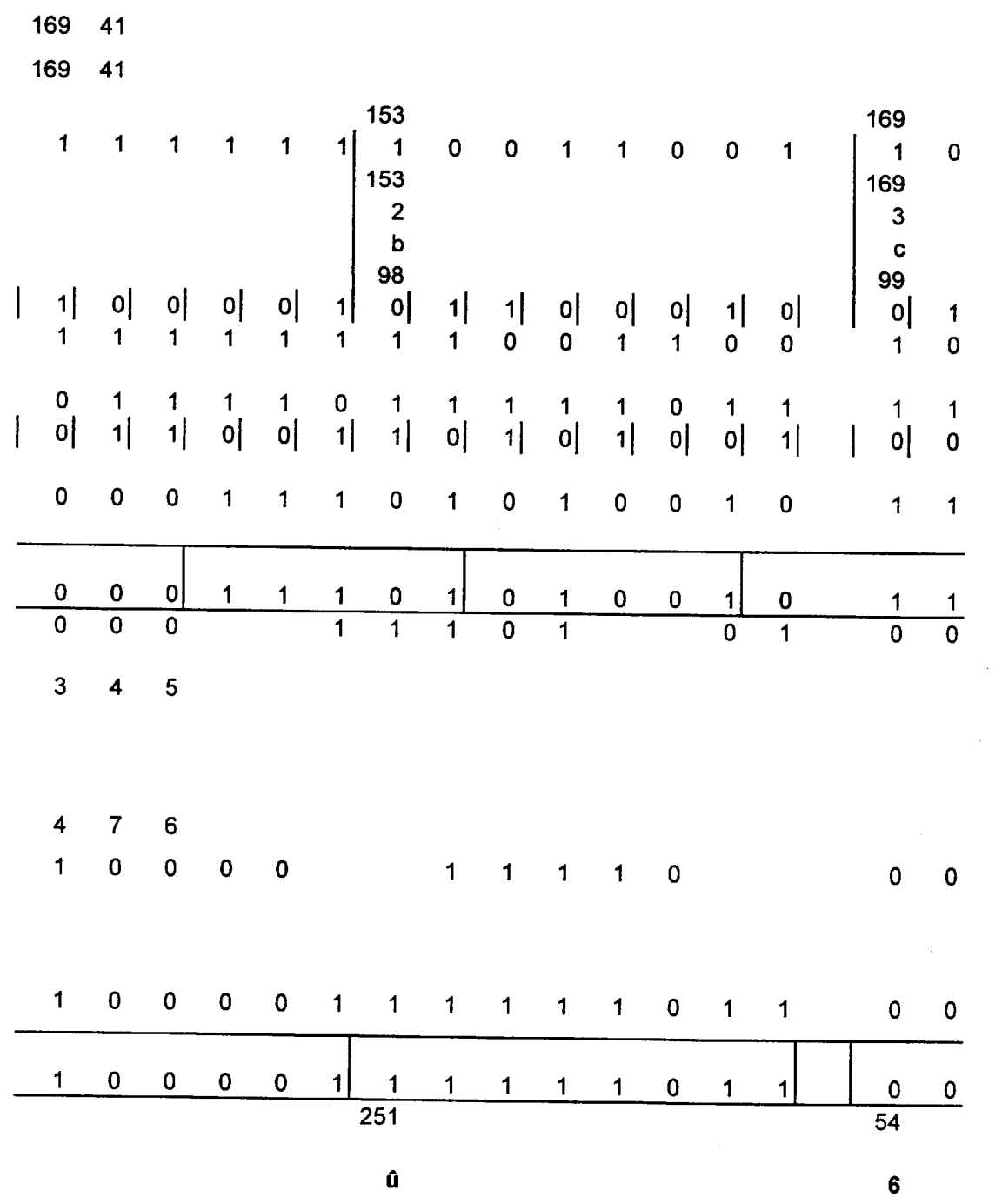

The encryption process, which may be implemented for example by means of a computer program or by means of dedicated hardware, is shown in detail in FIG. 2. The steps of the encryption procedure are as follows.

(1) The computer software generates four pseudo-random numbers 5A–5D. Methods of generating pseudo-random numbers in a computer are well known and so will not be described in detail. As an example, however, the numbers may be generated by extracting four numbers from the computer system time at the moment of generation. The four pseudo-random numbers 5A–5D, which have values between 0 and 255, are converted into 8-bit digital words 6A–6D.

(2) The cipher takes a set of ten characters 1A–1J from the plaintext message (in this case, the letters a,b,c .j).

(3) Each of the ten plaintext characters 1A–1J is converted according to its ASCII value 7A–7J into an 8-bit word, so generating ten 8-bit words 8A–8J.

(4) Each of the 8-bit words 8A–8J is combined by means of the XOR function with one of the 8-bit words 6A–6D that are derived from the random numbers 5A–5D. This produces a new set of ten 8-bit words 9A–9J.

The order in which the 8-bit words 8A–8J representing the plaintext characters are combined with the 8-bit words 6A–6D representing the random numbers is determined by the internal rules of the encryption algorithm, which are unique to each version of the encryption software.

In the example shown in FIG. 2, the 8-bit words representing the random numbers 6A–6D and the plaintext characters 8A–8J are combined in the following order:

1st character 8A with 1st random number 6A
2nd character 8B with 2nd random number 6B
3rd character 8C with 3rd random number 6C
4th character 8D with 4th random number 6D
5th character 8E with 1st random number 6A
6th character 8F with 2nd random number 6B
7th character 8G with 3rd random number 6C
8th character 8H with 4th random number 6D
9th character 8I with 1st random number 6A
10th character 8J with 2nd random number 6B

This is a very simple example. The random numbers may of course be combined with the plaintext characters in any order and there are a total of $4^{10}$ different ways in which these elements may be combined, the particular combination used being determined by the internal rules of the encryption algorithm.

(5) Optionally, step (4) is repeated one or more times, each time using a different set of internal rules, to remove any patterns resulting from the algorithm. In the illustrated example, the step is repeated once, the ten 8-bit words 9A–9J being combined with the 8-bit words 10A–10J representing the random numbers 6A–6D in the following order:

1st character 9A with 2nd random number 6B
2nd character 9B with 3rd random number 6C
3rd character 9C with 4th random number 6D
4th character 9D with 1st random number 6A
5th character 9E with 2nd random number 6B and so on.
This produces a new set of ten 8-bit words 11A–11J.

(6) The ten 8-bit words 11A–11J are split into sixteen 5-bit groups 12A–12P.

(7) Each of the 5-bit groups 12A–12P is expanded by the addition of 2 data bits to create sixteen 7-bit groups 13A–13P.

(8) The data bits within each of the 7-bits groups 13A–13P are moved to new positions according to an ordering sequence determined by the internal rules 14 of the encryption algorithm. This creates a new set of sixteen 7-bit groups 15A–15P.

In the example shown in FIG. 2, the first data bit is been moved to position 3, the second to position 5, the third to position 4, the fourth to position 7 and the fifth to position 6, and this re-ordering sequence has been applied to each of the sixteen 7-bit groups 15A–15P. It is of course possible that a different re-ordering sequence could be used for each of the sixteen 7-bit groups.

The ordering sequence employed in step (8) is unique to each version of the encryption software. A total of 1856 different sequences are possible for each of the sixteen 7-bit groups 15A–15P thus the number of different rules is $1856^{16}$.

(9) The two "empty" data bits in each of the sixteen 7-bit groups 15A–15P are filled with two of the data bits from the four 8-bit words 6A–6D that represent the random numbers 5A–5D, thereby producing sixteen 7-bit groups 16A–16P. In this way all thirty-two bits of the four 8-bit words 6A–6D are accommodated.

The order in which the thirty-two data bits of the four 8-bit words 6A–6D are transferred into the free spaces in the 7-bit groups 16A–16P is determined by the internal rules of the encryption algorithm. In the example shown in FIG. 2, the order of those bits is left unchanged. This is a very simple example.

There are approximately $2.63 \times 10^{32}$ permutations of the sequence for transferring the data bits and in practice a unique transfer sequence is used in each version of the encryption software.

(10) The sixteen 7-bit groups are re-divided into fourteen 8-bit words 17A–17N.

(11) These fourteen 8-bit words are converted into the ciphertext characters 2A–2N according to their ASCII values.

The ciphertext message is then transferred to the recipient, for example by means of a modem and a telephone link. The ciphertext message contains, in encrypted form, both the plaintext message of ten characters and also the four pseudo-random numbers 5A–5D that are needed by the decryption software to decrypt the message. The encryption technique therefore avoids the need to send a cipher key separately to the recipient, so avoiding any danger of the cipher key being intercepted.

It is extremely difficult to decrypt the message without knowing what the random numbers are and, since the data bits representing the random numbers cannot be retrieved without knowing the location of those bits, the ciphertext message cannot be decrypted without the correct version of the decryption algorithm. As each pair of encryption and decryption programs is unique, the encryption technique is extremely secure.

The decryption process is essentially the reverse of the encryption process and is shown in FIG. 3. The main steps of the process are as follows:

(1) The first fourteen ciphertext characters 2A–2N are converted into fourteen 8-bits words 20A–20N according to their ASCII values.

(2) These bits are rearranged into sixteen 7-bit groups 21A–21P.

(3) The thirty-two bits representing the random numbers 5A–5D are extracted from the 7-bit groups 21A–21P according to the internal rules of the decryption algorithm, which mirror the corresponding internal rules of the encryption algorithm, described at step (9) above. Those thirty-two bits 22 are re-assembled into the four 8-bit words 6A–6D that represent the four random numbers 5A–5D.

(4) The order of the five bits remaining in each 7-bit group 21A–21P is changed according to the internal rules of the decryption algorithm (which again mirror the corresponding internal rules of the encryption algorithm, described at step (8) above), producing sixteen 5-bit groups 23A–23P, which are then made into sixteen contiguous 5-bit groups 24A–24P.

(5) The sixteen 5-bit groups 24A–24P are re-divided to produce ten 8-bit words 25A–25J.

(6) These 8-bit words are combined by means of the XOR function with the 8-bit words 6A–6D that represent the random numbers 5A–5D according to the appropriate internal rules, so reversing step (5) of the encryption process and generating ten 8-bit words 26A–26J.

(7) Step (6) is repeated, again according to the appropriate internal rules, so reversing step (4) of the encryption process and generating ten 8-bit words 27A–27J.

(8) These 8-bit words 27A–27J are converted back to the plaintext characters, 3A–3J, according to their ASCII values.

It will be noted that in order for the decryption algorithm to correctly decrypt the encrypted message, the encryption and decryption algorithms must contain complementary sets of internal rules for re-ordering the data bits in the sixteen 7-bit groups 13A–13P and 23A–23P (respectively steps (8) and (4) of the encryption and decryption processes) and for inserting and extracting the data bits representing the random numbers into or from the sixteen 7-bit groups 16A–16P and 21A–21P (respectively steps (9) and (3) of the encryption and decryption processes). The software for implementing the encryption and decryption process is therefore manufactured as a matched pair of encryption and decryption programs that have complementary and unique sets of internal rules.

The above description relates to a situation where messages are exchanged between two people having a matched pair of encryption and decryption programs with identical internal cryptovariables. The invention may also however be adapted for use by communities of people, where some messages are intended to be read by all members of the community (but not by people outside the community) and other messages are intended to be read by specific members of the community but not others.

This is achieved by the use of message headers and license blocks, as will now be described with reference to FIG. 4, which illustrates an example where the community consists of four members 30, named A B C and D, who are able to send E-mail messages to each other via a central service provider 31. The four members A B C and D all have identical copies of the encryption/decryption cipher 32 and are thus able to encrypt plaintext messages and decipher encrypted messages sent by other members of the community. Those messages cannot, of course, be deciphered by people outside the community, who do not have the same encryption/decryption cipher.

Members of the community may wish to send messages that can be read only by certain members of the community and not others. For example, A may wish to send a message that can be read by B, but not by C or D. To achieve this, each user A B C and D is provided (by a separate party) with a license block 33 that contains data identifying the licensee, but does not contain any information such as rules or keys relating to the encryption/decryption process. These license blocks are unique, license block A being intended only for A's use, license block B being intended only for B's use, and so on.

Each license block 33 is encrypted using the version of the encryption/decryption cipher 32 shared by A B C and D. However, it cannot be converted into plaintext and can be decrypted and used only by an application 34 (i.e. a computer program or hardware device) associated with each user 30. The application 34 is itself protected by a password 35 or some other security device (for example a smartcard or a mechanical lock) that is unique to the user 30. The user 30 can therefore gain access to the application 34 only by entering the correct password. The password may for example be contained in encrypted form within the license block 33.

When A sends a secure message to B, the application 34 determines the identities of the sender (in this case A) and the intended receiver (in this case B) as well as the message content, which may be an Electronic Mail message and/or an attached set of files, and creates a "Message Header" that contains the identities of the sender A and the intended recipient B. The Message Header is encrypted as part of the complete message and is followed by blocks of encrypted information created from the plaintext message.

To decipher the encrypted message, B must first identify himself or herself to the application 34 by entering his password. Having thus identified himself, the application 34 deciphers the message header to ascertain who the message is intended for. In this case, as the message is intended for B, the application 34 then proceeds to decipher the message.

In the case of a message intended for several members of the community (but not all of them), details of all intended recipients may be included in the Message Header. If the identity of the receiver matches any one of the intended receivers identified in the Message Header, the application will decipher the message.

Another person who did not know B's password would not be able to decipher the message using B's application 34, since failure to enter the correct password would bar access to the application.

If another member of the community, for example C, attempted to decipher the message using his application 34, the application would determine from the Message Header that the message was not intended for C and so would not decipher the message. The confidentiality of the message would thus be ensured.

A number of variations of the encryption/decryption program are possible, some of which will now be described. To ensure the integrity of the message (i.e. to ensure that it has not been tampered with by a third party between transmission and receipt) a "one-way-hash" (OWH) may be incorporated into the message. Methods of providing a OWH are well known and are described, for example, in Applied Cryptography (supra).

The OWH is generated for the header and incorporated into the header. Other OWHs are generated for the blocks of plaintext and incorporated into the blocks of ciphertext. Another OWH is generated for the entire message and included in the final block of ciphertext.

The application receiving and decrypting the message regenerates these OWH values from the message and compares the values with those generated by the sending application. If the values are different, this indicates that the message has been altered.

To provide authentication (i.e. proof of the identity of the sender, to the receiver), the message header may include a "signature" indicator, which can be set to "true" or "false". The sender, if he wished to "authenticate" the message, identifies himself to the sending application by entering his password. The application checks this password against the encrypted password contained in the license block and, if they agree, sets the signature indicator in the message header to "true" and proceeds to encrypt the message as described above.

On receipt of the message by B, the receiving application identifies the signature indicator as "true" and advises the receiver that the message is authenticated.

To provide non-repudiation (i.e. to prevent the sender from denying later that he ha sent the message), proof can be provided of the identity of the sender and the date and time of sending. The sender's application determines the sender's identification and the date and time the message was created and includes that information in encrypted form in the message header. On receipt by the intended receiver, this information is made available and provides evidence that the message was sent by the sender, at the indicated time and date.

Figure 5:
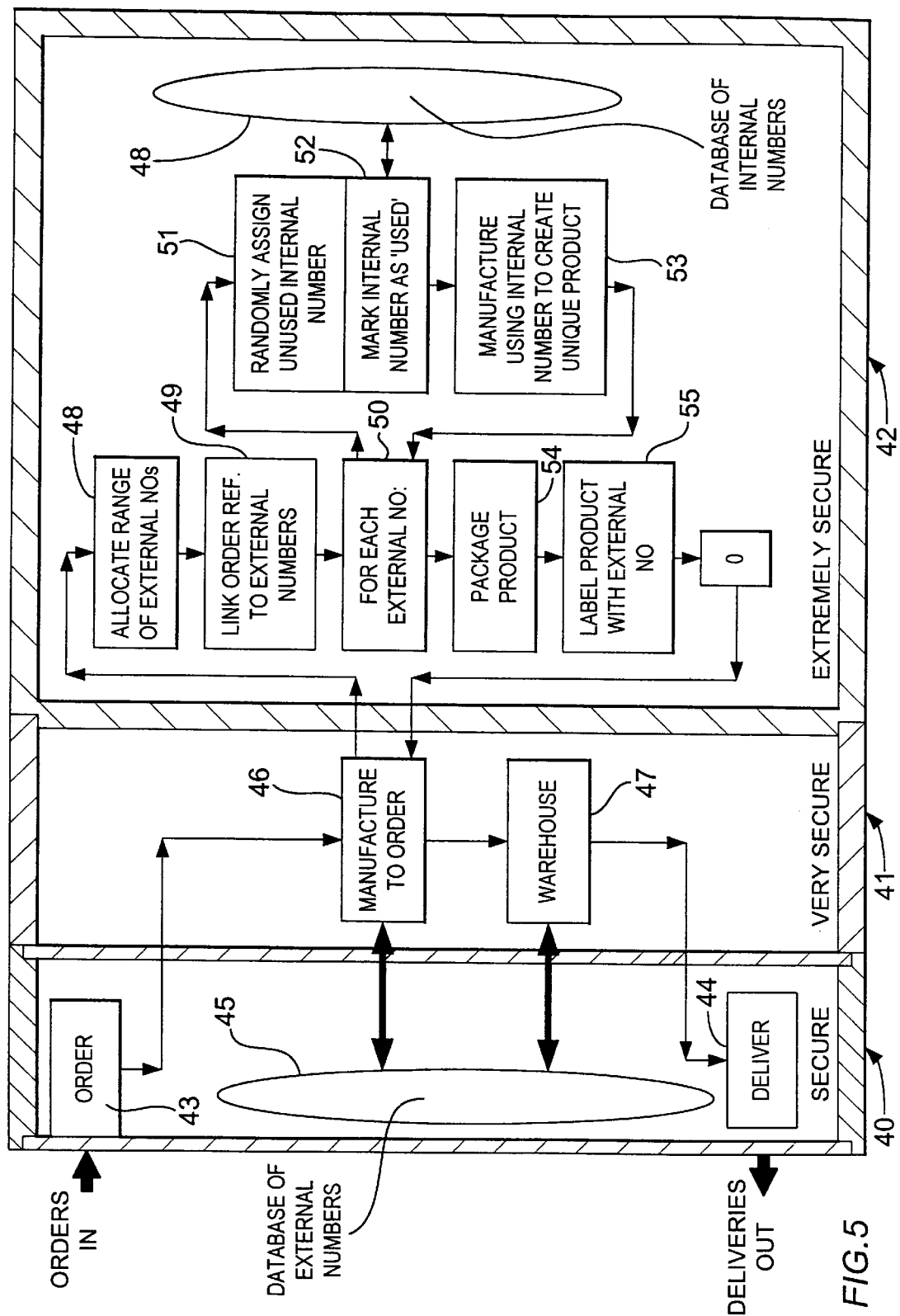
FIG. 5 is a flow diagram illustrating a method of manufacturing computer software for implementing the encryption/decryption process.

The process for manufacturing the software is shown by way of a flow diagram in FIG. 5. The manufacturing process takes place under three different levels of security, those being a "normal" security level 40, a "very secure" level 41 and an "extremely secure" level 42. The factory for manufacturing the software may be physically and electronically divided into separate areas in order to create these different security levels.

The processes taking place at the "normal" security level 40 are order reception 43, goods delivery 44 and record keeping, for which there is maintained a database 45 of external serial numbers.

The processes taking place at the "very secure" level 41 include the processing of instructions to manufacture to order a set of encryption and decryption software 46, and storage 47 of the manufactured software in a warehouse, prior to delivery to the customer.

The processes taking place at the "extremely secure" level 42 include the manufacturing and packaging/labelling of the product. In particular, these processes include the allocation to the encryption/decryption algorithms of the unique rules for re-ordering the data bits and for inserting/extracting the random numbers (steps (8) and (9) of the encryption process and steps (3) and (4) of the decryption process). These rules are determined by a set of internal numbers that is written into the computer software, and this set of internal numbers is extracted on a random basis from a database 48.

The manufacturing process is as follows. Upon receipt of an order at the order reception area 43, a manufacture to order command 46 is generated, which causes an external serial number to be read from the database of external numbers 45 and sent to the extremely secure section 42. The external serial number or serial numbers are allocated 48 and linked to the order reference numbers 49. For each external reference number 50 a set of internal numbers chosen at random from the database 48 and assigned 51 to the computer software. Simultaneously, the selected set of internal number is marked in the database 48 as "used" 52, so preventing that set of internal number being allocated to another version of the computer software. The computer encryption and decryption software is then manufactured 53 using the selected internal numbers, thereby creating a unique product consisting of a complementary pair of encryption and decryption algorithms. The product is then packaged 54 and labelled 55 with the external serial number. Finally, the product is stored 47 in a warehouse and eventually delivered 44 to the purchaser.

It should be noted that the set of internal numbers allocated to the encryption/decryption software is selected at random from the database 48 and that those internal numbers are written into the encryption/decryption programs in a "blind" manufacturing process at an extremely high level of security. Also, whilst the database is marked to prevent any set of internal numbers being used more than once, no record is made of which set of internal numbers has been allocated to any particular version of the software. It is therefore impossible to tell what set of internal numbers has been used in the manufacture of any particular version of the software, either by examining company records, by "bugging" the manufacturing process or, for example, by bribing or blackmailing an employee of the manufacturing company. The manufacturing process is therefore extremely secure.

Once the software has been manufactured it may be delivered to the customer, for example by transmission over a data link.

This provides the advantage that a user of the software can change to a new version of the encryption algorithm on a regular basis, for example every day.

Various modifications of the technique are possible. For example, in order to reduce the length of the encrypted message, the plaintext may be compressed prior to encryption. Many data compression techniques are known and one of these may be incorporated into the encryption/decryption software.

The encryption/decryption process may also be implemented by hardware which may, for example, be incorporated into a modem or other data transmission device. The encryption/decryption process may then be entirely invisible and seamless to the users of the process.

The encryption processes may also be modified to use a larger or smaller number of random numbers 5A–5D and/or larger or smaller blocks of plaintext and/or larger or smaller sets of bits, which may for example be sets of 8 bits, 16 bits or 256 bits (etc). For example, a 40 character block of plaintext may be combined with 16 random numbers to generate a 56 character ciphertext or with 32 random numbers to generate a 72 character ciphertext. Alternatively, a 320 bit block of plaintext may be combined with sixteen 8-bit random numbers to generate a 448-bit block of ciphertext.

What is claimed is:

1. A method of encrypting data in which:
   a random variable for use as a key is generated in binary digital form,
   a first set of data representing a plaintext message in binary digital form is combined with the random variable to generate a second data set in binary digital form,
   the data bits representing the random variable are inserted into the second data set according to a first predetermined set of rules,
   and the order of the data bits in the second data set is altered according to a second predetermined set of rules, thereby generating a third data set for transmission as a ciphertext message,
   said third data set containing in encrypted form the data representing both the plaintext message and the key.

2. A method according to claim 1, in which the first set of data is combined with the random variable by means of the XOR function.

3. A method according to claim 1, in which the random variable comprises a plurality of random numbers and those random numbers are combined with the first set of data according to a third predetermined set of rules.

4. A method according to claim 3, in which the first set of data is combined by means of the XOR function with the random numbers a plurality of times, the order of said random numbers being changed each time.

5. A method according to claim 3, in which the first set of data, the random numbers and the modified data set are all in the form of 8-bit words.

6. A method according to claim 5, in which the second data set is divided into 5-bit words, which are expanded to 7-bit words by the inclusion of the data representing the random numbers and then re-divided into 8-bit words.

7. A method according to claim 6, in which the plaintext message is encrypted in groups of ten characters, which are represented in the first data set as ten 8-bit words and are combined with four 8-bit random numbers to produce a third data set of fourteen 8-bit words.

8. A method according to claim 7, in which a plaintext message of ten characters is converted to a ciphertext message of fourteen characters during encryption.

9. A method according to claim 1, in which the plaintext message is compressed prior to encryption.

10. A method according to claim 1, in which a message header is added to the plaintext message and is encrypted together with the plaintext message.

11. A method according to claim 10, in which the message header includes data identifying the intended recipient of the plaintext message.

12. A method according to claim 11, in which the message header includes data identifying the sender of the plaintext message.

13. A method according to claim 12, in which the identity of the sender is verified before data identifying the sender is included in the message header.

14. A method of decrypting data that has been encrypted using a method according to claim 1, in which:
   the data bits representing the random variable are extracted from the third data set according to a first predetermined set of complementary rules, the random variable representing the key is recreated from the extracted data bits, the order of the data in the third data set is altered according to a second predetermined set of complementary rules to regenerate the second data set, and the second data set is combined with the random variable representing the key to regenerate the first set of digital data representing the plaintext message.

15. A method of decrypting data that has been encrypted using a method according to claim 10, in which:

the data bits representing the random variable are extracted from the third data set according to a first predetermined set of complementary rules, the random variable representing the key is recreated from the extracted data bits, the order of the data in the third data set is altered according to a second predetermined set of complementary rules to regenerate the second data set, and the second data set is combined with the random variable representing the key to regenerate the first set of digital data representing the plaintext message, and the message header is decrypted before the plaintext message.

16. A method according to claim 15, in which the message header includes data identifying the intended recipient of the plaintext message and, after receiving, the data identifying the intended recipient of the plaintext message is extracted, the identity of the actual recipient is verified and the plaintext message is decrypted only if the actual recipient is the intended recipient.

17. A method of encrypting and decrypting data, in which a random variable for use as a key is generated in binary digital form, a first set of data representing a plaintext message in binary digital form is combined with the random variable to generate a second data set in binary digital form, the data bits representing the random variable are inserted into the second data set according to a first predetermined set of rules, and the order of the data bits in the second data set is altered according to a second predetermined set of rules, thereby generating a third data set for transmission as a ciphertext message, said third data set containing in encrypted form the data representing both the plaintext message and the key, the data bits representing the random variable are extracted from the third data set according to a first predetermined set of complementary rules, the random variable representing the key is recreated from the extracted data bits, the order of the data in the third data set is altered according to a second predetermined set of complementary rules to regenerate the second data set, and the second data set is combined with the random variable representing the key to regenerate the first set of digital data representing the plaintext message.

18. A device for decrypting data, the device including:

input means for receiving a first set of data representing a plaintext message in binary digital form, generator means for generating a random variable for use as a key in binary digital form, processor means for combining said first set of data with said random variable to generate a second data set in binary digital form, for inserting the data bits representing the random variable into the second data set according to a first predetermined set of rules and for altering the order of the data bits in the second data set according to a second predetermined set of rules, thereby generating a third data set representing a ciphertext message, said third data set containing in encrypted form the data representing both the plaintext message and the key, and output means for transmitting said ciphertext message.

19. A device according to claim 18, in which said processor means includes means for adding to said ciphertext message an encrypted message header containing data identifying the intended recipient of the message.

20. A device for decrypting data that has been encrypted using a device according to claim 18, said device including:

input means for receiving said ciphertext message, processor means for extracting data bits representing said random variable from said ciphertext message according to a first predetermined set of complementary rules, for altering the order of the data in said ciphertext message according to a second predetermined set of complementary rules, for recreating the random variable representing the key from the extracted data bits, and for combining data in said ciphertext message with the random variable representing the key to regenerate the plaintext message, and output means for said plaintext message.

21. A device according to claim 20, in which said processor means includes means for extracting from said encrypted message header said data identifying the intended recipient of the message, verifying the identity of the actual recipient and comparing the identity of the actual recipient with that of the intended recipient, said processor means being arranged to decrypt said ciphertext message only if the actual recipient is the intended recipient.

22. A method of manufacturing means for implementing an encryption and decryption method according to claim 17, the method including the steps of:

extracting data representing complementary sets of predetermined rules from a database, processing the data representing the complementary sets of predetermined rules to incorporate those rules into algorithms for encrypting and decrypting the data, and recording data representing those algorithms in a data recording means for use in implementing the encryption and decryption methods.

23. A method according to claim 22, in which after the data representing complementary sets of predetermined rules has been extracted from the database, the database is marked to prevent those rules being used again.

24. A method according to claim 23, in which the steps of extracting the complementary sets of predetermined rules from the database and incorporating those rules into the algorithms for encrypting and decrypting the data are carried out automatically and without any record being made of the predetermined rules incorporated into the means for implementing the encryption and decryption methods.

25. A method according to claim 1, in which the data representing a plaintext message is divided into a plurality of data blocks, and each data block is combined with a different random variable to generate the second data set.

* * * * *